June 23, 1959 V. CATINI 2,891,585
MACHINE FOR MAKING BOOK BINDER ELEMENTS
Filed Sept. 6, 1955 6 Sheets-Sheet 1

INVENTOR
VINCENZO CATINI
BY Klein & Hart
ATTORNEYS

June 23, 1959     V. CATINI     2,891,585

MACHINE FOR MAKING BOOK BINDER ELEMENTS

Filed Sept. 6, 1955     6 Sheets-Sheet 3

INVENTOR
VINCENZO CATINI
BY
ATTORNEYS

June 23, 1959 V. CATINI 2,891,585
MACHINE FOR MAKING BOOK BINDER ELEMENTS
Filed Sept. 6, 1955 6 Sheets-Sheet 4

INVENTOR
VINCENZO CATINI
BY
ATTORNEYS

United States Patent Office 2,891,585
Patented June 23, 1959

2,891,585

MACHINE FOR MAKING BOOK BINDER ELEMENTS

Vincenzo Catini, Forest Hills, N.Y., assignor to Spiral Binding Company, Inc., New York, N.Y., a corporation of New York Application September 6, 1955, Serial No. 532,724

17 Claims. (Cl. 140—71)

This invention relates to a machine for making binder elements for books, pamphlets, notebooks and the like. The binder elements which may be made on the machine of this invention, are each composed of a wire that has been formed by the machine into a series of spaced ring-like members united by tie rods and are of the character shown in United States Patent No. 2,555,290 issued to M. H. November, May 29, 1951.

In my United States Patent No. 2,129,605, issued September 6, 1938, there is disclosed a machine capable of making binder elements of the indicated type. The principal purpose of the present invention is to provide a machine which is substantially improved in both construction and operation over the machine of such patent.

It is important that such machines make such binding elements with great accuracy otherwise they will be difficult to mount on the books on a quantity basis and will cause damage to the books and detract from their appearance. One of the objects of the present invention is to provide a machine of the indicated type which can make such binding elements with greater accuracy than has heretofore been possible on prior machines so that the finished elements will be substantially straight without bend or deformation in either a horizontal or vertical direction and can be readily applied to books with great rapidity without damage to the latter.

Another object of the invention is to provide an improved machine of the indicated type which is relatively simple and compact in construction, which is relatively inexpensive to construct and operate, and which is wholly automatic in performing its sequence of operations.

Other objects, as well as the advantages of the invention, will become apparent from a perusal of the following detailed description of the machine, when read in connection with the accompanying drawings, in which.

Figures 1, 26, 27:
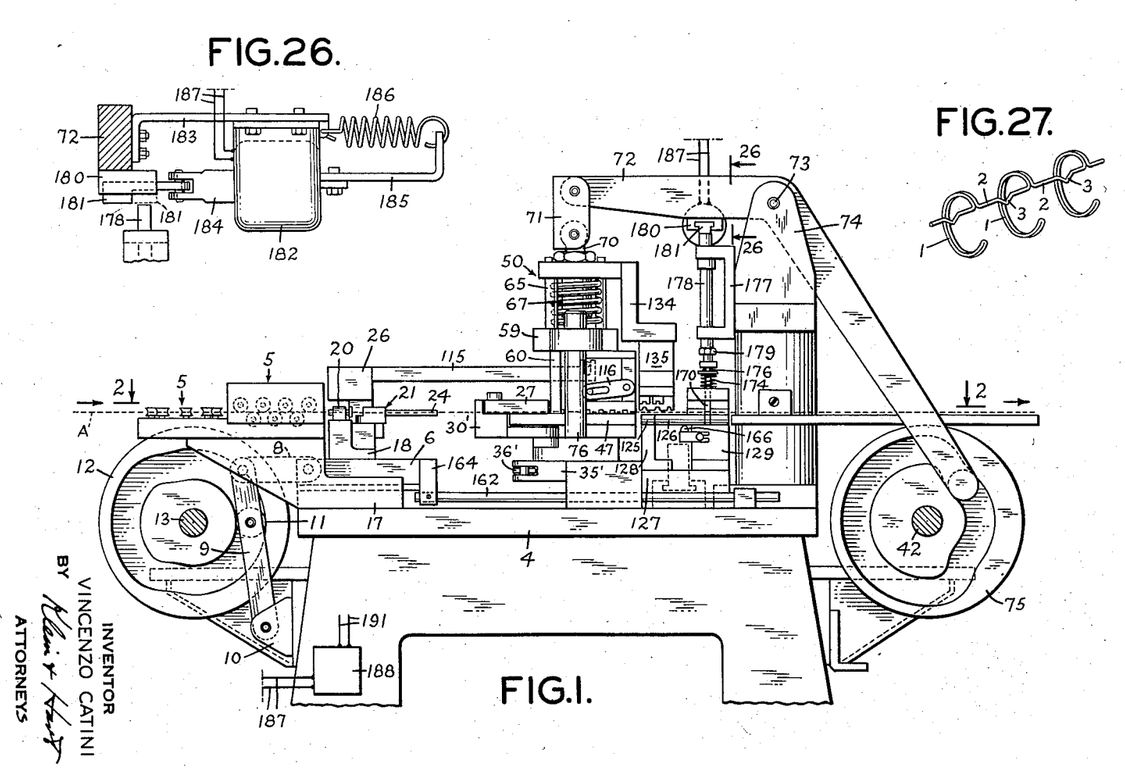
Fig. 1 is a front elevational view of a machine for making bookbinders elements in accordance with the invention.
Fig. 26 is a sectional view taken along the line 26—26 of Fig. 1, to show the mechanism for controlling the cutter device.
Fig. 27 is a perspective view showing a portion of a binder which can be made on the machine of this invention.

The particular embodiment of the invention illustrated in the drawings is constructed to manufacture the form of binder element illustrated in Fig. 27. As shown in this figure, the binder element is composed of a series of open ring members 1 which are adapted to be inserted through a series of perforations provided along the binding edge of the pages of a book and then closed in any suitable fashion to bind the pages together. The ring members are connected together in spaced relation by short integral sections or tie-rods 2 which form the backbone of the book and which are provided intermediate the ring members with projections or dimples 3 that are arranged in opposed, spaced relation to the tips of the ring members. As explained in the aforesaid Patent No. 2,555,290, the projections 3 are in the nature of stop members to prevent inadvertent removal of the pages over the free ends of the ring members which need not be entirely closed on the bound book.

Figure 2:
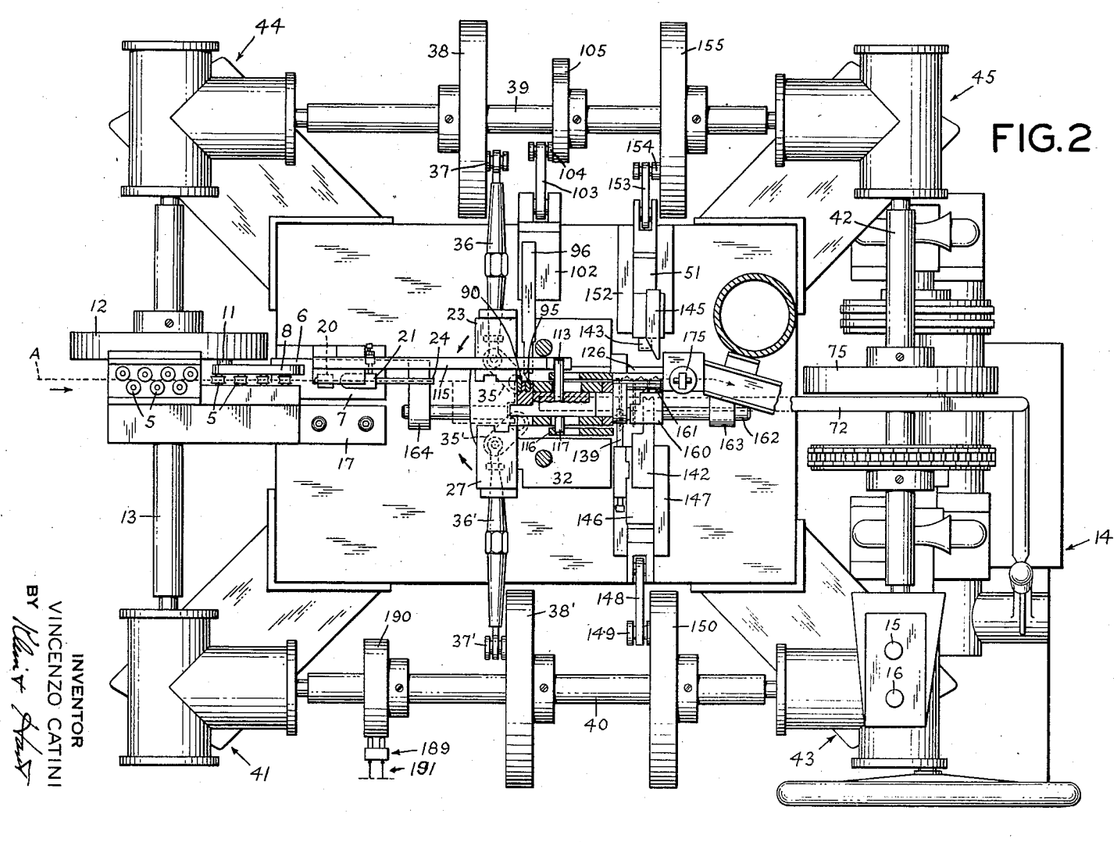
Fig. 2 is a top plan generally taken along the line 2—2 of Fig. 1.
Figures 3, 4, 5, 6, 7:
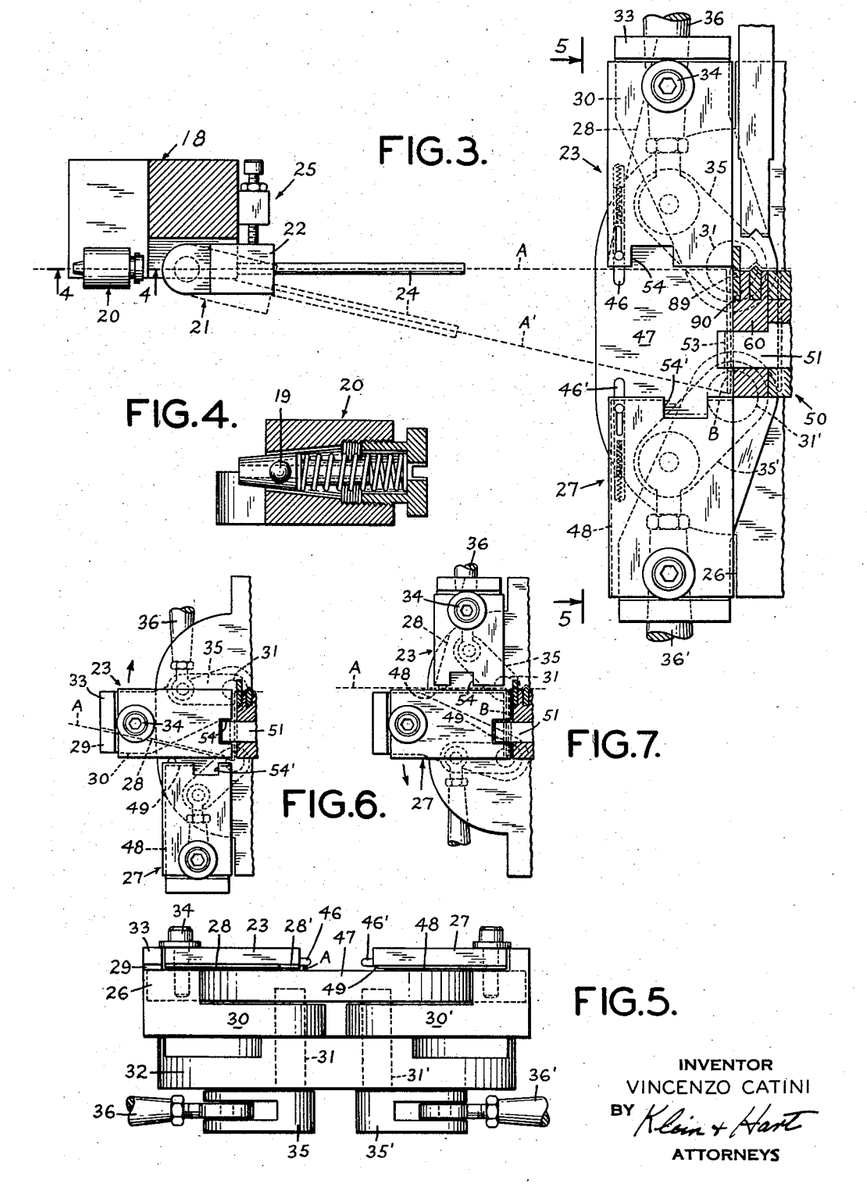
Fig. 3 is a detailed top plan view partly in section of the feeding, folding and dimpling mechanism.
Fig. 4 is a vertical sectional view taken along the line 4—4 of Fig. 3.
Fig. 5 is an end view of the folding mechanism looking toward the line 5—5 of Fig. 3.
Fig. 6 is a top plan view of the folding mechanism and showing one of the folding members at the end of its bending operation to form the first section of a tongue of the binder.
Fig. 7 is a view similar to Fig. 6 showing the other folding member at the end of its bending operation to complete the formation of one of the tongues.

The binder elements are formed from a straight piece of wire A upon which the successive operations are performed in line as the wire passes from the entry to the delivery end of the machine. In such travel of the wire A, straight tongues B are initially formed in the wire and then such tongues are bent by tools into the ring members 1 shown in Fig. 27. As shown in Figs. 1 and 2 of the drawings, the base of the machine supports a table 4 at the entry end of which is provided two wire straightening units 5, 5 disposed lengthwise of the machine and at right angles to each other and each comprising a series of grooved rollers which straighten the wire A as it is fed from a suitable source, such as a roll or reel (not shown) so that the wire is initially fed into the machine substantially straight and free of kinks or bends. The units 5, 5 are mounted on a plate which is supported by a bracket 17 on table 4. The wire A then passes through a feeding device which intermittently draws the wire through the wire straightening units 5 from the supply reel and simultaneously feeds the advanced end thereof, being formed through the machine. The feeding device is composed of a slide 6, slidably mounted on guide 7 secured upon the table 4 adjacent to the bracket 17. The slide 6 is connected by a link 8 to one end of a lever 9 pivotally supported at its other end by a bracket 10 connected to the base of the machine. Intermediate its ends, the lever 9 is provided with a cam roller 11 which engages the track of a cam 12. The track of cam 12 is designed to intermittently cause the slide 6 to be advanced and retracted longitudinally of the machine and in timed relation to the other operating elements of the machine. The cam 12 is secured to a cross shaft 13 which is connected in a manner which will hereafter be more clear to a motor 14 that is continuously rotating during the operation of the machine. Mounted on a block 18 secured upon the slide 6 is a clutch 20 through which the wire passes and the details of which are illustrated in Fig. 4. The construction of the clutch is well known and is such that on the advancing stroke of the slide 6 or to the right as viewed in Fig. 4, the bearing balls 19 thereof are caused by the conically shaped chamber to grip the wire and advance it with the slide, while on the return stroke of the slide such bearing balls 19 will release the wire thereby permitting the clutch to ride freely on the wire without imparting rearward movement thereto.

The wire A passes from the clutch 20 to a guide 21 mounted for pivotal movement in a horizontal direction on the block 18 supported by the slide 6. As shown more clearly in Fig. 3 of the drawings, the guide 21 is composed of a block 22 which is pivotally supported adjacent to its entry end on block 18 so that when the wire passageway therethrough is disposed substantially lengthwise in parallelism with the centerline of the machine its longitudinal axis will be in alignment with the longitudinal axis of clutch 20 and closely adjacent to and in parallelism with the working end of a forming member 23. Connected to the exit end of the block 22 is a tube 24 whose passageway is in alignment with the wire passageway of block 22 and extends a substantial distance toward the former 23. The block 22 and the tube 24 are restricted against substantial movement rearwardly past the line of lengthwise feed of the wire in parallelism with the centerline of the machine by an adjustable stop 25 connected to the block 18 mounted on slide 6. The block 22 and tube 24, are, however, free to pivot forwardly from such line of feed when the portion of the wire engaged by the former 23 is bent forwardly as will hereinafter be explained. These parts are returned to normal position by the action of a former 27 on the wire in completing the formation of a tongue B. Thus the block 22 and tube 24 forming the guide 21 will be intermittently pivoted from the full line position shown in Fig. 3 to the dotted line position thereof shown in such figure in the operation of the machine. The guide 21 facilitates the proper shifting and positioning of the wire portions with respect to the formers and prevents kinks or bends being formed in the feeding wire during the operations of the formers. The tube 24 thereof is preferably made sufficiently long so that a maximum portion of the wire is under control until it is operated upon by the formers 23 and 27.

Figure 25:
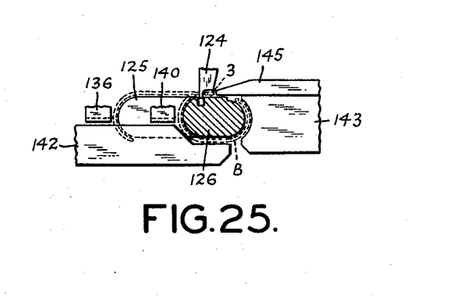
Fig. 25 is a similar view illustrating the manner in which the binder element is straightened on the mandrel.

The wire in its travel between formers 23 and 27 is given a double bend to provide a flat tongue-like member B formed at substantially right angles to the direction of feed of the wire and comprising two parallel sections of wire joined by a bend at the forward end thereof. Subsequently the tongues B formed by the formers 23 and 27 will be successively bent into the ring members 1 shown in Fig. 25 of the drawings. In forming a tongue B, the initial bend in the wire is made by the former 23 and the second bend to complete the tongue is made by the former 27, the two formers pivoting across this station of the machine from the positions shown in Fig. 3 with an alternate reciprocating motion as illustrated in Figs. 6 and 7 and in their advancing strokes each forms a bend in the wire A to provide one of the legs of the tongue. The former 23 in the form of a plate is mounted on the raised shoulder 26 of an arm 30 connected to a vertically disposed pin 31 extending through a bearing aperture in a bushing 32 supported by a block on the table of the machine and terminating at its upper end in a recess on the under side of a guide plate 47. It will be noted from Fig. 5, that the upper surface of should 26 is on a level with the upper surface of guide plate 47 over which the former will sweep in the formation of a tongue B in the wire. The former 23 is securely seated in position on such raised shoulder 26 by a raised flange 33 provided on arm 30 and a bolt 34 which extends through the former and into the shoulder.

It will be noted from Figs. 5 and 6 of the drawings, that while the working end of former 23 rides on the upper surface of guide 47, the outer under side edge of such former is provided with a grove 28 which for the major portion of its length progressively increases in depth towards the pivoted end of the former. Provided in the flange 33 and aligned with the rear end of groove 28 is a recess 29 which forms a continuity of the groove through the flange for a portion of its length. It will be seen more clearly in Fig. 6 of the drawings that the groove 28 permits the wire A to enter under the advancing side edge of former 23 and to extend through recess 29 during the advancing movement of the former, thereby lessening the possibility of kinks or bends being formed in the wire by the former as the wire is shifted from the position A in Fig. 3 to the position A' in such figure in the formation of the first leg or section of a tongue B. The working end of former 23 is plane and not recessed except for a recess 54 the purpose of which will be later explained. Secured to the bottom end of pin 31 is an arm 35 to which is connected one end of a link 36 provided on its rear end with a cam roller 37 which is engaged in the track of a cam 38 secured to a rear shaft 39. Thus as the link 36 is reciprocated by cam 38 during the rotational movement of shaft 39, the arm 35 will be pivoted from the position shown in Fig. 3 to the position shown in Fig. 6, pivoting the arm 30 and former 23 about the pivotal axis of pin 31 from the position shown in Fig. 3 to the position shown in Fig. 6.

The former 27, which is substantially of the same type and construction as the former 23, is mounted in a similar fashion on an arm 30' connected to a vertically disposed pin 31' extending through a bearing aperture in the bushing 32 and provided at its lower end with an arm 35', the latter being connected by a link 36' and cam roller 37' to a cam 38' secured to a shaft 40 extending along the front of the machine. Shaft 40 is connected at the entry end of the machine to the forward end of shaft 13 by a suitable bevel gearing unit 41 and is connected to the forward end of the driven shaft 42 at the discharge end of the machine by a suitable bevel gearing unit 43. In a similar fashion shaft 39 is connected at one end to shaft 13 by gearing unit 44 and at its other end to shaft 42 by gearing unit 45. Shaft 42 is connected to motor 14 by suitable clutch mechanism controlled by the start and stop buttons indicated by the numerals 15 and 16, respectively.

The former 27 differs from the former 23 in that it is not provided in its outer side edge with an inclined or progressively enlarged groove such as the groove 28 in former 23 because in its sweeping motion it shifts the wire from position A' in Fig. 3 to position A in which the wire will be in alignment with the line of feed of the wire into the machine. However, former 27 is provided along its advancing or outer side edge with a groove 48 of uniform depth to receive the wire when it is advanced to the position shown in Fig. 7. It will be understood that in such position of the formers such side edge of former 27 will be in engagement with the working end surface of former 23 with the wire tucked in groove 48 between such formers. In this connection also it might be pointed out that when the formers are in the positions shown in Fig. 6, the grooved side edge of former 23 will be in engagement with the working end surface of former 27. To enable this to be accomplished the forward end portion of the groove 28 which extends up to the working end of such former and indicated by the numeral 28' in Fig. 5, is like groove 48, of a uniform depth approximating the thickness of the wire. Groove 28, from the rear end of groove portion 28', gradually increases in depth in the manner previously explained. Former 27, further differs from former 23 in that its working end is provided with a groove 49 of a depth approximating the diameter of the wire to receive the section of the wire it sweeps forward and to permit such section to come into engagement with the section bent by former 23 while permitting the working end of former 27 to come into engagement with the die head at the end of its bending movement. Projecting forwardly from the operating faces or working ends of the formers 23, 27 are spring pressed pins 46, 46', respectively, under one of which the wire is located when positioned adjacent to the operating face of its associated former to maintain the wire in flat relation against the upper surface of the guide plate 47 during the bending movements of such formers. The pins 46 and 46' are pushed to wholly retracted position by the die against which the tongue is formed at the end of the bending movements of formers 23 and 27.

Figures 8, 11, 12:
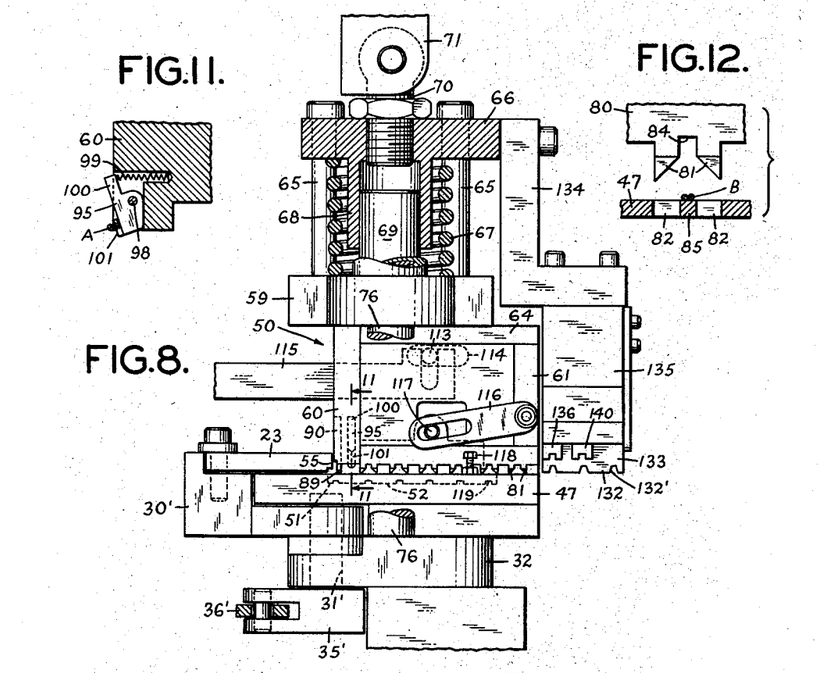
Fig. 8 is a front elevational view partly in section of the die mechanism which cooperates with the formers to bend the wire and which holds and feeds the formed wire to the bending mandrels.
Fig. 11 is an enlarged detailed vertical sectional view of the dimpling device on the die mechanism and taken along the line 11—11 of Fig. 8.
Fig. 12 is an enlarged detailed view of the rake teeth provided on the die mechanism.

In the advancing movement of a former, the wire A is swept along guide plate 47, being retained thereagainst by the former's associated spring pressed pin, and is bent against the end forming wall 60 of a movable die 50. In this sweeping or bending action, the portion of the wire being bent by former 23 is forced into a groove 55 formed in the die wall 60 (note Fig. 8) and having a depth approximately equal to the diameter of the wire. The groove 55 has a height slightly less than the diameter of the wire being formed so that it is wedged by former 23 into such groove and will be retained in position by the latter during the return movement of former 23. Soon after, and before the former 23 starts its return movement, an extension 51 of a presser die on foot 52 mounted within die 50 for movement relative thereto moves in opposed relation to the feed of the wire through slot 56 in die wall 60 to project therebeyond. The extension 51 remains in this position during the advancement of former 27 which sweeps its section of wire under the same and into engagement with the wire section bent by former 23. The extension 51 is provided on its undersurface with a transverse groove 53 which has a width substantially equal to twice the diameter of the wire so that when the presser die 52 is lowered at the end of the bending operation the two wire sections forming the tongue B will be received in such recess and held by such extension 51 against the guide plate 47. The formers 23 and 27 are provided with recesses 54, 54', respectively, for receiving the end of extension 51 projecting beyond the end surface of die 50 while the working ends of such formers are up against the end wall 60 of die 50.

As will be seen more clearly in Figs. 1 and 8 to 10, the die head 50 is a hollow member or housing having an end wall 60 against which the wire is bent by the formers, an end wall 61 and side walls 62 and 63. The head 50 is provided with a top plate 64 which is connected by bolts to a bushing 59 having bolts 65 that extend up through apertures provided in a plate 66. The bushing 59 and plate 66 are normally maintained in spaced relation with the heads of bolts 65 engaging the top surface of plate 66 by a compression spring 67 mounted on a depending sleeve 68 provided on plate 66 and receiving a post 69 provided on bushing 59. Adjustably connected to plate 66 is a bolt 70 to which is connected one end of a link 71, the other end of which is connected to one end of a lever 72 pivoted at 73 on the upper end of a standard 74 supported by the table 4. The other end of lever 72 is provided with a cam roller which engages in the track of a cam 75 secured to shaft 42. It will thus be observed that as lever 72 is reciprocated about pivot 73 by cam 75 the die head 50 will be lowered and raised with respect to the guide plate 47. The die head is guided in its vertical movements by the stationary posts 76 which are supported on the bushing plate 32 and with which the bushing 59 is slidably engaged. At the end of the downward or advancing movement of the die head 50, the plate 66 will continue its downward movement for an additional distance against the yielding force of spring 67 for a purpose which will be hereinafter explained.

Figure 13:
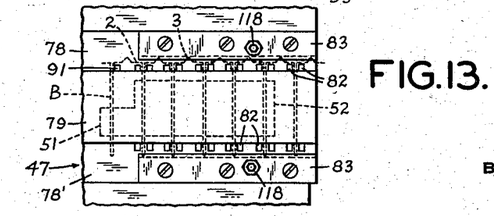
Fig. 13 is a top plan view of the guide means or bed on which the die mechanism operates and upon which the wire travels in its passage through the machine.

The side walls 62 and 63 of the die head are provided at their lower ends with longitudinally extending rakes or wire holding members 80 each provided with a series of spaced pairs of downwardly projecting teeth 81 adapted to enter a series of spaced pairs of openings 82 provided in the guide plate 47 adjacently inside a longitudinally extending guide 83 secured to the guide plate 47 as by bolts. The opposed longitudinal sides of the guides 83 are provided with guide grooves to receive the dimples 3 formed in the tie rod sections 2 between the tongues and to receive the free ends of such tongues as the formed tongues are moved in a step-by-step fashion on the guide plate 47 beneath the die head 50. In the machine illustrated there are six pairs of teeth 81 on each rake 80 and six pairs of teeth receiving openings 82 in each row of openings provided in the guide plate 47 adjacent to a guide 83. As is shown more clearly in Fig. 12 of the drawings, the rake teeth 81 in each pair are spaced from each other to provide a rectangularly shaped recess 84 to receive the wire sections forming a tongue B and the portion 85 of guide plate 47 between the pair of openings 82 associated therewith. The series of openings 82 are spaced apart so that the roots of the tongues B formed in the wire, rest on the guide plate portions 85 adjacent to the rear guide 83 and the portions of the tongues adjacent to the free ends thereof rest on the guide plate portions 85 adjacent to the front guide 83. Thus when the die head descends, the root and free ends of each tongue B will be clamped in the recesses 84 of the aligned pairs of teeth in the front and back rakes between the upper ends of such recesses and the aligned guide plate portions 85 of the guide plate 47. The recesses 84 have a width approximately equal to twice the diameter of the wire. It will be noted that the bottom portions of the inner edges of each pair of teeth 81 are inclined at an angle of approximately 90° and that the opposed faces of aligned pairs of teeth are beveled to a point in the region of such inclined inner edge portions. Thus should the two legs of a tongue B be separated as the die head descends such legs will be gathered together by the pairs of teeth and held in close side by side relation. Preferably also, the plate 47 is provided on its upper surface with a recessed portion on which is seated two side strips 78, 78' and a central strip 79, as shown more clearly in Fig. 13 of the drawings. The series of openings 82 are made in the form of notches along the inner opposed edges of strips 78, 78' and are closed by strip 79. Guide strips 83 are secured to the strips 78, 78'.

Mounted on the end wall 60 of die head 50 is a plate 90 provided at its lower end with a downwardly projecting substantially centrally located pin 89 adapted to enter an opening 91 provided in guide plate 47 (note Figs. 3, 13 and 14) and around which the wire is turned as the former 23 bends the wire toward the forming wall 60 in forming the initial leg of a tongue B. As shown in Figs. 2 and 3, the outer surface of the plate 90 is closely adjacent to the axis of rotation of former 23 and forms part of the working surface of the wall 60 against which the tongues are formed. The portion 88 of the end of plate 90 in front of the pin 89 is in the nature of a heel that engages with the guide plate 47 when the die head is lowered. The rear end portion of plate 90 in back of the pin 89 is higher than portion 88 and above plate 47 a distance so that it keeps the wire flat on the plate 47 but does not clamp it to the latter. Thus the wire may be drawn under such rear end portion of plate 90 while maintained by the latter in engagement with the plate 47.

Also mounted on the end wall 60 of the die head 50 is a die member 95 which cooperates with a bar 96 (note Fig. 2) to form the dimples 3 in the wire. As seen more clearly in Fig. 11 of the drawings the die member 95 is mounted in a vertical slot formed in the wall 60 for vertical movement about a horizontal axis 98 and is normally biased in a counter clockwise direction, as viewed in such figure, by a spring 99 bearing against an upper extension 100 thereof so that the working or die edge 101 thereof will pass behind the wire A resting on the guide plate 47 when the die head is lowered. On further downward movement of the die head, the engagement of the member 95 with guide plate 47 will cause the member to pivot outwardly in a clockwise direction against the tension of spring 99. As a result of this outward pivotal movement of member 95, portion 101 thereof will push outwardly against the wire thereby bulging it to provide sufficient material to form a dimple. It will be noted that the wire material to form this bulge will be obtained from the supply length of wire because the previously formed tongue will by this time be clamped in position by the rakes 80, while the wire can still be drawn under the rear end portion of plate 90, as has been previously explained. The member portion 101 is substantially triangularly shaped and is receivable in a V-shaped slot formed in the advanced end of the bar 96. The bar 96 is mounted on a slide member 102 slidably mounted on the table of the machine and connected by a link 103 and a cam roller 104 to the track of a cam 105 secured to shaft 39. Thus after the die head has been advanced for the tongue forming operation the bar 96 will be advanced by cam 105 and together with die portion 101 will bend the straight portion of the wire immediately in advance of the pivotal axis of former 23 to form a dimple therein. The bar 96 will remain advanced with the formed dimple clamped between it and the member 95 during the formation of the initial leg of a tongue B by the former 23.

The pressure die or shoe 52 is supported by a pair of spaced bolts 110 which are secured to such shoe and extend up through passageways in a slide plate 11 slidably mounted on the upper ends of the side walls 62, 63 of the die head for movement within each head in a direction parallel to the center line of the machine. The plate or shoe 52 is normally maintained in advanced position and the heads of bolts 110 normally seated against slide plate 111 by springs 112 mounted on such bolts. Slidable movement is imparted to the slide plate 111 through a pin 113 which is connected to such plate and extends out through an elongated slot 114 in side wall 62 and through a longitudinally extending bar 115 which is connected at one end to the projecting end of said pin and which is supported at its other end on the block 26 mounted on slide 6. It will thus be seen that as slide 6 is advanced and retracted, the shoe assembly within die head 50 and composed of shoe 52, bolts 110 and slide 111 will also be advanced and retracted with relation to die head 50. Shoe 52 is also movable in a vertical direction relative to die head 50 by means of a pair of levers 116 which are pivotally connected to end wall 61 of the die head and are provided at their free ends with elongated slots through which extend the outer ends of a pin 117 which extends transversely through the shoe 52. Mounted on the guide plate 47 are a pair of posts 118 which are engaged by the levers 116 when the die head is advanced or lowered and cause such levers to be raised upwardly about their pivots. When the levers are so raised about their pivots, they raise the shoe 52 through pin 117 against the tension of the springs 112. When the die head is again retracted or raised, the springs will be permitted because of the reduction of pressure of the levers 116 on posts 118, to advance the shoe 52. It will be understood that the arrangement of levers 116 and posts 118 are such that at all times either the die head 50 or the shoe 52 will be in a lowered position so that the formed wire passing between the die head 50 and the guide plate 47 will always be under the control of either the die head 50 or the shoe 52. The shoe 52 is provided on its lower surface with a plurality of spaced transverse grooves 119 to receive the tongues B of the wire when such shoe is in advanced position against the guide plate 47.

Figure 9:
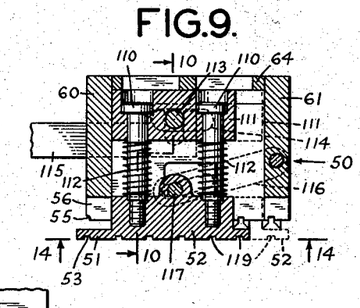
Fig. 9 is a vertical sectional view of the die mechanism and showing the parts for holding and feeding the formed wire.
Figure 10:
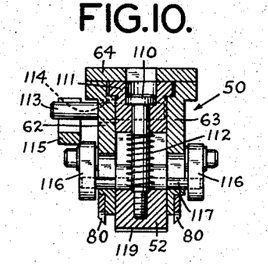
Fig. 10 is a vertical sectional view taken along the line 10—10 of Fig. 9.

It will be understood from the foregoing description of the die head, that when the latter is advanced or lowered from its retracted position, the shoe 52 is holding the formed wire tongues B against the plate 47 under the tension of springs 112 and is advanced forwardly to the dotted line position shown in Fig. 9 due to the fact that the slide 6 has advanced to feed additional wire for the next tongue to be formed and while advancing has advanced the shoe through rod 115 and slide 111 to shift the formed tongues B along plate 47. When the die head comes down sufficiently to enable the rakes 80 thereof to engage the formed tongues, the shoe 52 will be lifted through levers 116 and posts 118 so that the clamping action on the wire will be shifted from the shoe to the rakes of the die head. As the first forming tool 23 advances to form a new tongue, the slide 6 is withdrawn thus retracting the shoe 52 to the position shown in full lines in Fig. 9, but in a raised position. After the tongue has been formed in the wire, the die head will be raised and the shoe will be lowered so that the grip on the tongues will be shifted from the die head to the shoe with the groove 53 on the extension 51 of the shoe gripping the newly formed tongue. This is the position of the parts shown in Fig. 3 of the drawings. The slide 6 then advances to feed new wire and simultaneously to shift the shoe to the right, as viewed in Fig. 9, to the dotted line position shown, thus completing this cycle of such parts. It will also be understood from the previous description, that when the head is advanced, the working part 101 of the dimpling tool 95 will be held in a retracted position by the spring 99 so that it will move in back of the straight portion of wire which is to form the tie rod 2 for the tongue about to be formed. While the wire is held flat against the plate 47 by the bar 90 and before the first former 23 moves in to form the first leg of the tongue, the dimpling tool is straightened to draw sufficient wire under bar 90 to form a bulge for the dimple and the dimpling bar 96 is advanced. When the working end of bar 96 engages the wire bulge formed by tool part 101, the two coact to form the dimple without any strain on the formed wire which is in advance of the dimpling tool 95.

Figures 14, 15, 16, 17, 18:
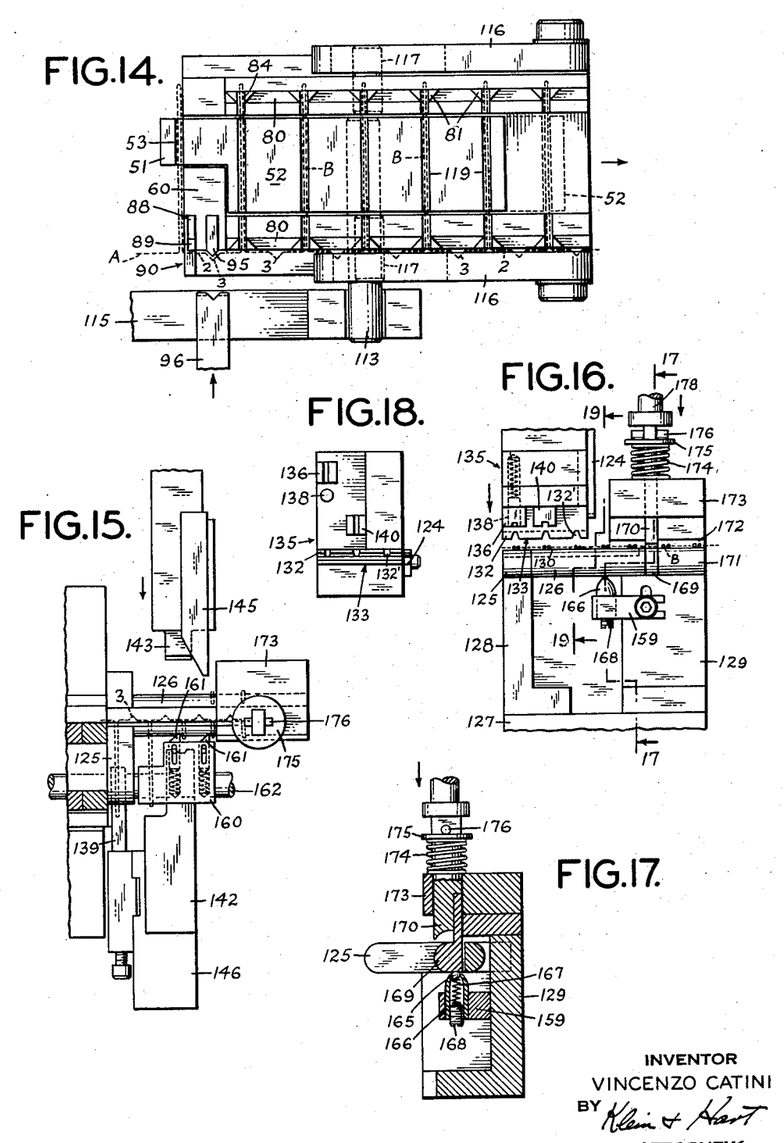
Fig. 14 is a bottom view of the die mechanism looking toward the line 14—14 of Fig. 9.
Fig. 15 is a top plan view of the mandrel on which the wire is formed into rings and associated mechanism.
Fig. 16 is a front elevational view of the mandrel and some of the associated mechanism.
Fig. 17 is a sectional view taken along the line 17—17 of Fig. 16.
Fig. 18 is a bottom view of the gripping and forming tools which are shown in the upper left part of Fig. 16.
Figure 19:
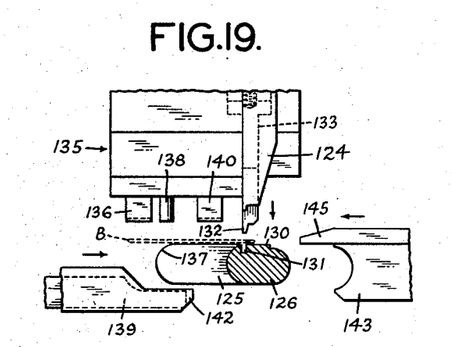
Fig. 19 is a vertical sectional view taken along the line 19—19 of Fig. 16 and showing the arrangement of the mandrel and associated forming tools prior to the initial bending operation on one leg of the binder.

Up to this point, the repeated step-by-step operations of the machine upon the wire A, result in the production of a spaced series of straight tongues B which lie substantially flat on the guide plate 47 as they are successively passed in a step-by-step fashion toward the discharge end of the die head 50, or to the right of such head as viewed in Fig. 1 of the drawings. As has been previously indicated, each tongue B is made up of two sections of wire, which are practically in surface contact, and successive tongues are joined by a single wire tie rod 2 in which has been formed a dimple 3. The thus formed wire passes from the die head 50 to a mandrel upon which it is fashioned to eliminate any possible vertical or horizontal curvature in the formed wire and to convert the straight tongues into the open ring members 1 shown in Fig. 27 of the drawings. As shown in Figs. 1 and 16, the mandrel is composed of an enlarged portion 125 and a reduced portion 126 and is supported on a block 127 by brackets 128, 129, the enlarged portion 125 of the mandrel being mounted on the bracket 128, and the discharge end or the reduced portion 126 thereof, being mounted on the bracket 129. The block 127 is mounted on table 4. The mandrel has a longitudinally extending horizontal anvil surface 130 (note Fig. 19) which is defined along its front longitudinal edge by a groove 131 adapted to receive the teeth 132 of a spring wire holding fork 133. It will be understood that as a formed wire is moved over the mandrel the tie bars 2 and dimples 3 thereof will rest on the anvil surface adjacent to the inner wall of the groove 131, while the tongues B will extend transversely across such groove as is indicated in Fig. 19. As shown in Fig. 16 the teeth 132 are separated by recesses 132' formed to enable the fork to straddle three tongues B adjacent to their tie rods, and to maintain the two sections of wire forming each tongue practically in surface contact during the bending of such tongues. The heel of fork 133 engages the tie rods connecting the tongues B and the dimples 3 formed therein and presses the same against the surface 130 during the advancement of the fork. As a result of this pressing action on the tie rods and dimples any vertical curvature in the wire will be corrected for at this time by the heel of fork 133 and the anvil surface. The fork remains in its downward position to hold the aforesaid parts of the forward wire fixed while the tongues are being bent to ring shape. The fork 133 is mounted in a body 135 supported by a bracket 134 secured to plate 66 of the die head 50 in any suitable manner as by bolts (note Figs. 1 and 8). Thus the fork 133 partakes of the reciprocating movements of the die head and on the advancing movements of the latter engages the wire on the mandrel after the die head has come to rest and while the plate 66 is still moving down under the action of lever 72 against the tension of spring 67.

Figure 20:
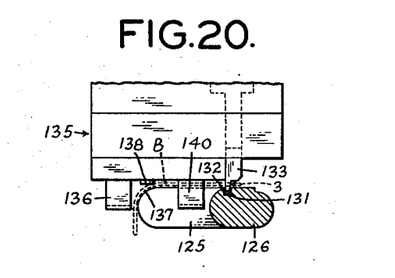
Fig. 20 is a view similar to Fig. 19 and shows the first operation performed on a leg or tongue of the binder.

Also mounted in the body 135 is a downwardly projecting grooved forming tool 136 which, in the advancing movement of such body, bends the free end of a tongue B positioned on the enlarged portion 125 of the mandrel down on the curved surface 137 of such portion as shown in Figs. 19 and 20 to give the tongue its initial curvature. Located on the body 135 directly in back of the tool 136 is a spring pressed pin 138 which engages with the tongue adjacent to the end thereof to be bent and together with the fork 133 holds the two legs or sections of the tongue firmly against the mandrel during the initial bending operation of tool 136. While the tongue on mandrel position 125 is still held by fork 133, pin 138 and tool 136, a tool 139 advances in a horizontal direction and completes the curvature of the end of the tongue about the surface 137 of mandrel portion 125 (note Figs. 19 and 21). In the periodic operations of the machine, the tongues B are successively fed from the die head 50 to the mandrel portion 125 and each given the above explained initial curvature at its free end. The partially formed tongues are then successively advanced from the mandrel portion 125 to the mandrel portion 126, on the latter of which the bending of the tongues to their final shape is accomplished.

Figure 22:
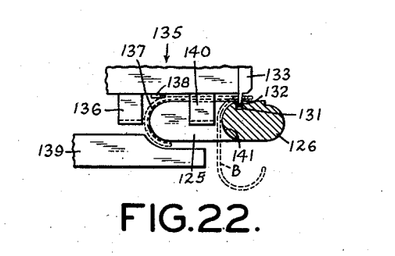
Fig. 22 is a similar view illustrating the method of bending a tongue on the binder adjacent to its root.
Figure 23:
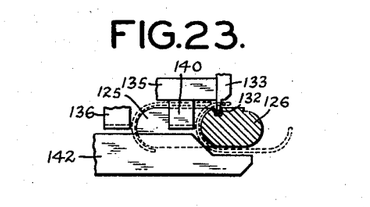
Fig. 23 is a similar view showing a further step in bending the tongue of the binder.
Figure 24:
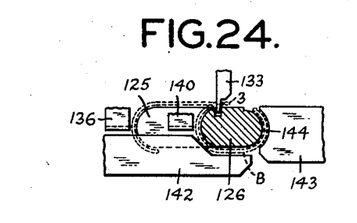
Fig. 24 is a similar view shown the final bend in a binder tongue.

After leaving the mandrel portion 125, a partially formed tongue B is advanced to a position on mandrel portion 126 beneath a grooved tool 140 carried by the body 135. During the advancing movement of the body 135, the tool 140 engages the tongue at a place adjacent to the associated tie rod thereof and bends the root end of the tongue down on the curved surface 141 of mandrel portion 126 to give to such root end the curvature of such surface. As shown in Fig. 22, the curved surface 141 of mandrel portion 126 continues up to the forward edge of groove 131 so that the curvature imparted to the tongue will extend up to its associated tie rods. The tongue B whose formature I am following is next advanced on step on mandrel portion 126 to a position between a pair of bending tools 142, 143. Bending tool 142 is located in front of the mandrel and advances rearwardly in a horizontal direction to bend the tongue completely around the curved mandrel surface 141 and so that the central portion of such tongue extends horizontally rearwardly against the flat under surface of mandrel portion 126 as shown in Fig. 23 of the drawings. With the tool 142 holding the tongue in this position against mandrel portion 126, tool 143 which is located in back of the mandrel (note Fig. 15) advances forwardly horizontally and bends the tongue portion adjacent to the free bent end thereof about the curved surface 144 of mandrel portion 126, in the manner shown in Fig. 24 to finish the bending of the tongue.

It will be noted from Figs. 2 and 15 of the drawings, that tools 139 and 142 are mounted on a slide 146 slidably mounted in a guide 147 secured to the table of the machine. The slide 146 is connected by a link 148 and a cam roller 149 to the track of a cam 150 secured to shaft 40. It will also be noted from these figures that tool 143 is mounted on a slide 151 slidably mounted on a slide block 152 and connected by a link 153 and cam roller 154 to the track of a cam 155 secured to shaft 39. Tool 143 carries a wire straightening tool 145 which advances and retracts with the former as a unit. The working end of tool 145 is offset with respect to the working end of tool 143 so that while the latter is advancing into engagement with a tongue to complete the formation thereof as explained, tool 145 advances into engagement with the tie rod connecting such tongue to the previously finished tongue at a point just in advance of the dimple 3 formed therein or to the right of such dimple as viewed in Fig. 15 of the drawings. During such engagement the tool 145 distorts the tie rod at this point if the formed wire needs correction to eliminate any horizontal curvature which may have been imparted to the wire during the formation thereof. During this engagement of tool 145 with the tie rod, the dimple thereof is maintained against movement by a spring pressed tool 124 carried by body 135 on the advanced end thereof (note Figs. 16 and 19). As will be understood from a comparison of Figs. 16 and 19, when the fork 133 is advanced into engagement with the formed wire on the mandrel, the working end of tool 124 will enter the dimple of the tie rod connected to the third tongue engaged by the fork and hold the same in position on the anvil surface 130 against any tendency of tool 145 forcing the dimple out of position during its pushing engagement with such tie rod.

Associated with the mandrel portion 126 in the working area of the bending tools 142 and 143 and straightening tool 145, is a block 160 provided with a pair of spring pressed feeding pawls 161, the ends of which engage two adjacent tongues or rings on the mandrel portion 126, as shown more clearly in Fig. 15. During the operation of tools 142 and 143 and while the slide 6 is in an advanced position, the edge of the leading surface of the advanced pawl 161 is up against the tongue which is just in advance of the fork 133, and the edge of the leading surface of the other or following pawl 161 is up against the third tongue held by fork 133 and shaped by the tools 142, 143. The block 160 is mounted on a lower feed bar 162 which is slidably supported at its forward end by a guide member 163 and which is supported at its other end by a bracket plate 164 connected to slide 6. Thus when the slide 6 is next retracted the pawls 161 will be moved to the left as viewed in Figs. 2 and 15 until the advanced pawl has slipped over the tongue at the station of tools 142, 143 and the other pawl has slipped over the tongue located between such station and the mandrel portion 125. When the slide 6 next advances the advanced plane faces of the pawls will cause the tongues engaged thereby to be shifted to the right along mandrel portion 126. The pawls 161 therefore facilitate the feed of the tongues along the mandrel portion 126 about which they are closely formed by the 140, 142 and 143 as has been previously explained.

Located one step in advance of the block 160 provided with the pawls 161, and adjacent to the end of reduced mandrel portion 126 is a detaining pawl in the form of a ball bearing 165 projecting from the end of a casing 166 and yieldably maintained in such position by a spring 167 and an adjustable nut 168. The unit is carried by a bracket 159 adjustably secured to bracket 129. The ball bearing 165 engages the underside of mandrel portion 126 under pressure in back of the most advanced tongue on such portion so that when the formed wire is severed at the end of such mandrel portion, the wire on such mandrel portion will be prevented from springing back toward the enlarged portion 125 of the mandrel. The ball bearing however does not interfere with the advancement of the wire along mandrel portion 126 by the pawls 161.

The formed wire is severed at the end of mandrel portion 126 by cutting mechanism which includes a member 169 having a body portion similar in configuration to and aligned with the end of mandrel portion 126 so that it forms a continuation of the latter and receives the formed wire as it is discharged from such mandrel portion. The member 169 is positioned between the mandrel and a cutting block 171 mounted on bracket 129 and having a configuration similar to that of mandrel portion 126 and member 169 so that the formed wire will also readily be guided thereon as it passes over member 169 from mandrel portion 126. These three parts are so arranged with respect to the feed of the formed wire, that when the latter comes to rest in its step-by-step advancement, the dimple 3 of a tie rod will be positioned substantially centrally of the body portion of member 169 between the adjacent ends of mandrel portion 126 and block 171. The ends of mandrel portion 126 and block 171 have cutting edges formed to cooperate with the cutting edges of a knife 170 to cut out a section of a tie rod including the dimple thereof which is resting on member 169. As shown more clearly in Figs. 16 and 17, the cutter or knife 170 is spaced slightly above the guide or body portion of member 169 which is secured to such knife for movement therewith. The knife 170 is in the form of a rod mounted for reciprocating movement in a vertical direction in a block 173 supported by the bracket 129. The upper end of the cutter is enclosed by a spring 174 seated on block 173 and engaging at its upper end a washer 175 held against upward displacement on the cutter by a nut 176, the arrangement being such that the spring 174 normally maintains the guide member 169 in alignment with mandrel portion 126 and guide 171 and maintains the cutter 170 in a raised position. Slidably supported above the cutter by a bracket 177 mounted on the standard 74 and resting on the upper end of the cutter is a cutter actuating rod 178 which is also normally in a raised position by the spring 174. The rod 178 is provided with an adjustable set screw 179 whereby the position of rod 178 may be adjusted relative to cutter 170. Mounted on lever 72 above rod 178 is a slide block 180 which carries a slide 181. When the slide 181 is in its normally advanced position on the block 180, none of the parts mounted on the lever 72 will come into engagement with the rod 178 during the pivotal movements of such lever. When the slide 181 is moved to a retracted position however, on the next pivotal movement of the lever 72 in a clockwise or advancing direction, the slide 181 will engage the top of the rod 178 and cause it to be depressed against the tension of spring 174 thereby giving the cutter 170 its full cutting stroke. The means for retracting the slide 181 is a solenoid 182 supported on lever 72 by a bracket 183. The armature 184 of the solenoid is pivotally connected at its forward end to slide 181 and at its rear end by a clip 185 to one end of a spring 186 which is connected at its other end to the housing of the solenoid. Thus, whenever the solenoid is energized, the armature is retracted to retract slide 181 against the tension of spring 186 to a position over the actuating rod 178. When the solenoid is deenergized, the spring 186 will return the armature and consequently the slide 181 to their normal advanced positions to permit the lever 72 to continue its pivotal movements without operation of the cutter actuating rod 178. The solenoid 182 is connected by an electric cable 187 to a timing device 188 mounted on the frame of the machine (note Fig. 1) and which in turn is electrically connected by wires 191 to a suitable button switch 189 actuated by cam 190 on shaft 40 (note Fig. 2). It will be understood that on each rotation of cam 190, switch 189 is actuated to actuate the timing device 188 which is a standard device constructed to close the circuit containing the solenoid 182 when the switch 189 has been actuated or closed fifteen times or any other number which may be selected by the operator. As during each rotation of cam 190 a tongue B is formed in the wire, the cut strips or lengths of binder will include fifteen ring members 1 if the timing device has been so set to actuate the solenoid.

Figure 21:
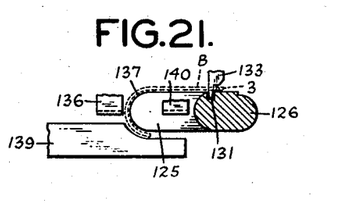
Fig. 21 is a similar view illustrating the manner in which the outer end of the leg or tongue is given a curved shape.

It will be understood from the foregoing description of the machine, that when in its operation, the die head 50 is in a raised position as shown in Fig. 1 of the drawings, all the tools are withdrawn and the presser foot 52 is in a retracted position, as shown in Figs. 3 and 9, but holding pressed down against the guide plate 47 six tongues B which have been previously formed. Cam 12 initiates the start of a cycle by advancing the slide 6 forwardly to feed a section of wire to the formers 23 and 27. During the advancing movement of slide 6, the bar 115 is advanced to advance the presser foot 52 from the position shown in full lines to Fig. 9 to the position shown therein in dotted lines. As a result of this advancement of presser foot 52, the previously formed tongue will be moved from the tongue forming station to a position under die head 50 and a previously formed tongue will move from under the die head to the enlarged mandrel portion 125. The tongue leaving the mandrel portion 125 will advance one step to the mandrel portion 126 and the tongues on the latter will be advanced one step. This feed of the tongues on the mandrel portion 126 will be facilitated by the pawls 161 which will be likewise advanced because of their connection to the lower feed bar 162 which is also connected to slide 6. After the slide 6 has finished its advancing step, cam 75 comes into operation to cause lever 72 to start the downward movement of die head 50 which continues until the rake bars 80 thereof straddle the portions of the tongues projecting from the grooves of the presser foot and adjacent the ends of such tongues. As the rake bars move further to clamp the ends of the tongues, the presser foot is raised by levers 116 and the posts 118 in the manner previously explained. While the head 50 is being lowered cam 105 moves the dimpling tool 96 forwardly and just after the wire is transferred from the presser foot to the die head, such tool cooperates with the die 101 to form a dimple in the bulged portion of wire preceding the last formed tongue, which wire portion shall constitute the tie bar for the next tongue to be formed. After the die head has gripped the wire and during the continued movement of the working end of lever 72, the teeth 132 of fork 133 enter the recess 131 in the mandrel so that such fork comes into holding relation on the tie rod ends of the tongues, simultaneously the spring pressed pin 138 engages the tongue positioned on the mandrel portion 125 and the tool 136 bends the free end of such tongue in the manner shown in Figs. 19 and 20. Simultaneously also, the tool 140 bends an advanced tongue on the mandrel portion 126 in the manner shown in Fig. 22. With the diehead down on the wire, dimpling tool 96 holding against the dimpling die 101, and the fork 133 and tools 136 and 140 holding in the positions shown in Figs. 19 and 22, cam 38 causes the former 23 to advance and form the first leg of the new tongue in the manner shown in Fig. 6. As the former 23 is being withdrawn cam 38' advances the former 27 to form the second leg of the new tongue in the manner shown in Fig. 7 of the drawings. During the advancing movement of former 23, cam 12 retracts slide 6 thus retracting presser foot 52 in its raised position through rod 115 and retracting the pawls 161 through the lower feed bar 162, the wire being held by the die head 50 on plate 47 and by the previously mentioned parts which are still holding the wire on the mandrel. During the advancing movement of former 23 also, cam 150 causes tools 139 and 142 to advance to finish the bending of the end of the tongue on the mandrel portion 125 as shown in Fig. 21 and to bend the tongue rearwardly under the mandrel portion 126 as shown in Fig. 23 of the drawings. These tools 139 and 142 hold in their advanced positions during the withdrawal of the former 23 and the advancement of former 27 to form the second leg of the new tongue. During the advancement of former 27, cam 105 withdraws the dimpling tool 96 and cam 155 advances tools 143 and 145 to perform the operations shown in Figs. 21 and 25 of the drawings. During the retractions of former 27, cam 75 withdraws die head 50, cam 150 withdraws tools 139 and 142, and cam 155 withdraws tools 143 and 145. In the initial upward movement of the working end of lever 72 fork 133, pin 138 and tools 136 and 140 are lifted away from the mandrel. As the lever continues its upward movement, the die head 50 is lifted and during the initial upward movement of the die head and before the rake bars thereof have released their hold on the wire, the presser foot 52 is lowered to hold the wire against the plate. This completes the cycle of the machine, and during such cycle it will be noted that the wire is at all times held in engagement with plate 47, either by the presser foot 52 or the die head 50. The cam 190 controlling the timer switch, is forced to close such switch 189 when the slide bar 6 starts its advancing movement to feed the wire, and maintains such switch closed until after the slide bar 6 has been retracted and the first leg on the new tongue has been formed by the former 23.

While I have hereinabove described and illustrated a preferred form of my invention, it will be apparent to those skilled in the art that various changes and modifications may be made therein without departing from the spirit of the invention, or the scope of the appended claims.

I claim:

1. In a wire forming machine, guide means for the wire, die means for holding on said guide means formed wire attached to a supply length of the wire, a pair of formers alternately reciprocating across said guide means and cooperating with said die means to bend a supply length of the wire into a tongue disposed at right angles to the longitudinal axis of said guide means and composed of two parallel sections of the wire, said die means including a die against which the wire is bent by said formers and having means for holding previously formed portions of the wire on said guide means during the forming operation, means for advancing said die into forming and holding position and for retracting the same therefrom, means for actuating said formers in succession to form a tongue in the wire after said die has been advanced into forming and holding position, a presser foot associated with said die for holding successive tongues formed in the wire on said guide means when said formers have completed their bending operation, means supporting said presser foot for movement relative to said die, means operable to move said presser foot toward said guide means and into tongue holding position when said die is retracted from said guide means after a bending operation and to withdraw said presser foot from such position when said die is advanced towards said guide means for a bending operation, and means operable to cause said presser foot while in holding position to move relative to said die in the direction of feed of the wire to advance the successive tongues formed in the wire along said guide means prior to the actuation of said formers and to retract such advanced presser foot by moving the latter relative to said die in a direction opposed to the direction of feed of wire when such presser foot is in withdrawn position.

2. In a wire forming machine, guide means for the wire, die means for holding on said guide means formed wire attached to a supply length of the wire, a pair of formers alternately reciprocating across said guide means and cooperating with said die means to bend a supply length of the wire into a tongue disposed at right angles to the longitudinal axis of said guide means and composed of two parallel sections of the wire, said die means including a die having a forming face opposed to the feed of the wire and against which the wire is bent by said formers and having in advance of said forming face a pair of parallelly spaced longitudinally extending holding members for engaging transversely spaced portions of successive tongues previously formed in the wire to hold such tongues against said guide means during the bending action of said formers, means for advancing said die into forming and holding position and for retracting the same therefrom, means for actuating said formers in succession to form a tongue in the wire after said die has been advanced into forming and holding position, a presser foot located between the die holding members for holding successive tongues previously formed in the wire on said guide means when said formers have completed their bending operation, said presser foot having spaced transverse grooves to receive portions of said tongues located between said die holding members, means operable to move said presser foot into tongue holding position when said die is retracted and to withdraw said presser foot from such position when said die is advanced towards said guide means for a bending operation, and means operable to advance said presser foot in the direction of feed of the wire while in holding position to advance the formed wire along said guide means prior to the actuation of said formers and to retract said presser foot in a direction opposed to the feed of the wire while in a withdrawn position and during the actuation of said formers to bring the first groove in such presser foot over the place of formation of such tongues by said formers and die.

3. In a wire forming machine, guide means for the wire, die means for holding on said guide means formed wire attached to a supply length of the wire, a pair of formers alternately reciprocating across said guide means and cooperating with said die means to bend a supply length of the wire into a tongue disposed at right angles to the longitudinal axis of said guide means and composed of two parallel sections of the wire, said die means including a die housing having an end wall opposed to the feed of the wire and providing a forming face against which the wire is bent by said formers and having side walls extending parallelly with the line of wire feed in advance of said end wall and each provided at its lower edge with a plurality of spaced pairs of teeth adapted to engage transversely spaced portions of successive tongues previously formed in the wire to hold such tongues against said guide means during the bending action of said formers, means supporting said housing for reciprocating movement in a vertical direction, means for periodically lowering said die housing into forming and holding position and raising the same therefrom, means for actuating said formers in succession to form a tongue in the wire after said die has been advanced into forming and holding position, a presser foot in said housing for holding successive tongues previously formed in the wire on said guide means and having spaced transverse grooves to receive portions of said tongues located between the side walls of said housing, means in said housing for slidably supporting said presser foot for movement in a direction longitudinally of said guide means and for supporting said presser foot for movement in a direction transverse of said guide means, means operable to move said presser foot toward said guide means into tongue holding position when said die is retracted and to withdraw said presser foot from such position when said die is advanced towards said guide means for a bending operation, and means to advance said presser foot in the direction of feed of the wire while in holding position to advance the formed wire along said guide means prior to the actuation of said formers and to retract said presser foot in a direction opposed to the feed of the wire while in a withdrawn position and during the actuation of said formers to return the grooves to their starting positions for the forward feed of the tongues engaged thereby on the next advancement of said presser foot.

4. In a wire forming machine, guide means for the wire, die means for holding on said guide means formed wire attached to a supply length of the wire, a pair of formers alternately reciprocating across said guide means and cooperating with said die means to bend a supply length of the wire into a tongue disposed at right angles to the longitudinal axis of said guide means and composed of two parallel sections of the wire, said die means including a die housing having an end wall opposed to the feed of the wire and providing a forming face against which the wire is bent by said formers and having side walls extending parallelly with the line of wire feed in advance of said end wall and each provided at its lower edge with holding means adapted to engage transversely spaced portions of successive tongues previously formed in the wire to hold such tongues against said guide means during the bending action of said formers, means for periodically advancing said housing into forming and holding position and for retracting the same therefrom, means for actuating said formers in succession to form a tongue in the wire after said die has been advanced into forming and holding position, a presser foot in said housing for holding successive tongues formed in the wire on said guide means, means in said housing for supporting said presser foot for reciprocable movement in a direction longitudinally of said guide means, means for periodically advancing and retracting said supporting means to advance said presser foot in the direction of feed of the wire and to retract the same, coacting means connected to said presser foot and said die housing and constructed and arranged to move said presser foot toward said guide means into tongue holding position when said die is retracted and to withdraw said presser foot from such position when said die is advanced towards said guide means for a bending operation, said periodic means being constructed to advance said supporting means when said presser foot is in tongue holding position prior to the actuation of said formers, and to retract said supporting means when said presser foot is withdrawn from such position and during the actuation of said formers.

5. A wire forming machine such as defined in claim 4 in which said end wall of the die housing is provided with an opening on the edge portion thereof adjacent to said guide means, and in which said presser foot is provided with an extension adapted to extend through said opening when the presser foot is in a retracted position to overlie the place of formation of the wire by said formers and die wall, said periodic and coacting means cooperating to cause said presser foot extension to move toward said guide means after the actuation of said formers to hold a tongue formed by said formers and then to advance in the direction of feed of the wire to draw such tongue under said end wall of the die.

6. A wire forming machine such as defined in claim 1, in which said guide means includes a guide plate over which the wire passes in its advancing feed, spaced longitudinally extending guide members for guidingly engaging the free ends of said tongues and the wire to which the root portions of such tongues are connected, a series of paired openings provided in said guide plate adjacent to the inner longitudinal edge of each guide member, and in which the holding means provided on said die comprises two spaced, longitudinally extending series of teeth arranged in pairs and arranged to coact with said openings to grip the tongues adjacent to said guide members when said die is advanced, said presser foot being located between said spaced series of teeth and engaging the tongue portions located between such spaced guide members when said presser foot is moved to tongue held position and said series of teeth are withdrawn from said gripping relation with said tongues.

7. A wire forming machine such as defined in claim 1, in which said last mentioned operable means includes a wire feeding device located in spaced relation before said pair of formers so that the latter are positioned between said presser foot and said device, means connecting said presser foot to said device, and means for reciprocating said feeding device longitudinally of the machine to advance the wire and presser foot simultaneously prior to the actuation of said formers and to retract said presser foot during the actuation of said formers, said last mentioned operable means and said means operable to move said presser foot into and out of tongue holding position being constructed and arranged to return the presser foot in a direction longitudinally of the machine to its starting position after it has been withdrawn from tongue holding position and while said die is still in an advanced position.

8. A wire forming machine such as defined in claim 1, including a wire feeding device located in spaced relation before said pair of formers so that the latter are positioned between said die means and said device, a reciprocating slide supporting said device, a wire guide mounted on said slide so as to be located between said device and said formers and having an elongated wire passageway normally aligned with the line of feed of the wire through said device and extending from a point near said device a substantial distance toward said formers, means on said slide pivotally supporting said wire guide at its entry end for rotational movement about an axis at right angles to said line of wire feed and enabling said guide to swing under the sidewise movements of the wire feeding to the formers during the reciprocating wire bending operations of said formers, one of said formers being provided in its leading side edge with a recess of variable transverse depth to receive the wire extending from said wire guide towards the former during the reciprocating and rotational movements of said former and wire guide.

9. A wire forming machine such as defined in claim 1, including a wire bending member pivotally mounted on said die in position to engage a longitudinally extending portion of the wire adjacently in advance of the place of operation of said formers, means for maintaining said member retracted in inoperative position when said die is in a retracted position and for permitting said member to be advanced to an operative position when the die has been advanced to its forming and holding position for coaction with said formers, and means separate from said die and coacting with said advanced operatively positioned wire bending member to form said wire portion adjacently in advance of the place of operation of said formers.

10. In a wire forming machine, guide means for the wire, die means for holding on said guide means formed wire attached to a supply length of the wire, a pair of formers alternately reciprocating across said guide means and cooperating with said die means to bend a supply length of the wire into a tongue disposed at right angles to the longitudinal axis of said guide means and composed of two parallel sections of the wire, said die means including a die against which the wire is bent by said formers and having means for holding previously formed portions of the wire on said guide means during the forming operation, means for advancing said die means to move said die into forming and holding position and for retracting said die means to withdraw said die from such position, means for actuating said formers in succession to form a tongue in the wire after said die has been advanced into forming and holding position, a presser foot engageable with wire tongue portions other than those engaged by said die holding means to hold the tongues on said guide means when the formers have completed their bending operation, means carried by said die means for supporting said presser foot for movement relative to said die, means carried by said die means and operable to move said presser foot relative to said die in a direction transverse to the feed of the wire toward said guide means and into tongue holding position when said die and said holding means are retracted in the opposite direction from said guide means after a bending operation and to withdraw said presser foot from such position when said die and holding means are advanced towards said guide means for a bending operation, said operable means being constructed and arranged to permit said presser foot to move relative to said die in directions paralleling the direction of feed of the wire, and means operable to move said presser foot while in holding position in the direction of feed of the wire to advance the tongues along said guide means prior to the actuation of the formers and to retract such advanced presser foot in a direction opposed to the direction of feed of the wire when such presser foot is in withdrawn position, said last mentioned operable means including a slide located in spaced relation to said die means, means connecting said slide to said presser foot, and means for reciprocating said slide in directions paralleling the direction of feed of the wire.

11. A wire forming machine such as defined in claim 10, including a device carried by said die means in advance of said presser foot and movable toward a fixed surface on the machine during the advancement of said die, said device comprising means operable to clamp the wire to such fixed surface during the bending of the tongues, and a die member for bending the free end of a tongue around such fixed surface while the wire is so clamped.

12. A wire forming machine such as defined in claim 10, including a device carried by said die means in advance of said presser foot and movable toward a fixed surface on the machine during the advancement of said die, said device having an elongated surface adapted to engage a plurality of the wire portions connecting the tongues and to press the same against such fixed surface when the die is advanced to correct any vertical curvature in the wire.

13. A wire forming machine such as defined in claim 10, including means carried by said die means in advance of said presser foot and operable to clamp a wire portion connecting the tongues to a fixed surface on the machine when said die is advanced, and means movable transversely to said clamping means and operable to engage such wire portion at a point adjacent to the clamped part thereof and to distort the wire portion at said point to eliminate any horizontal curvature the wire might have.

14. A wire forming machine such as defined in claim 10 including a device carried by said die means in advance of said presser foot and movable toward a fixed surface on the machine during the advancement of said die, said device comprising means operable to clamp the wire to such fixed surface during the bending of the tongues, and a die member for bending the free end of a tongue around such fixed surface while the wire is so clamped, and a tool movable transversely to said die member for completing the bending of the free end of the tongue while such tongue is held against such fixed surface by said clamping means and die member.

15. A wire forming machine such as defined in claim 10, including a device carried by said die means in advance of said presser foot and movable toward a fixed surface on the machine during the advancement of said die, said device comprising means operable to clamp the wire to such fixed surface during the bending of the tongues, a first die member for bending the free end of a tongue around such fixed surface while the wire is so clamped and for clamping such bent free end to such fixed surface after such bending operation, and a second die member for simultaneously bending the root portion of another tongue around a spaced fixed surface of the machine, a tool movable transversely to said first die member for completing the bending of the free end of the tongue engaged by said member while such tongue is held against such fixed surface by such clamping means and first die member, and a pair of cooperating tools for completing the bending of the other tongue while the latter is held against such fixed surface by such clamping means and second die member.

16. A wire forming machine such as defined in claim 10, including a pair of spaced cutting members located in advance of said presser foot, a guide member located between and aligned with said cutting members, said guide member and cutting members having a substantially similar wire engaging configuration, a knife positioned in spaced relation above said guide member, means for normally maintaining said guide member aligned with said cutting members and said knife in raised position, said die means advancing and retracting means being associated with said means for maintaining the knife in raised position and operable during the advancement of the die thereby to actuate said maintaining means to cause said knife to cut out a portion of the wire between said cutting members, and means carried by said die means for engaging the wire adjacent to the cut end thereof to maintain the latter in proper position in the associated cutting member.

17. A wire forming machine such as defined in claim 10, including cutting mechanism located in advance of said die means, means for maintaining said cutting mechanism in inoperative position, and means for actuating said cutting mechanism to cut the wire including said die means and control means for rendering said actuating means operable, a timing device controlling said control means and operable to cause said control means to render said actuating means operable after a predetermined number of tongues have been formed in the machine, and means connected to one of the wire forming tools in said machine and operable every time such tool performs an operation on the wire, said last mentioned means being connected to and controlling said timing device.

References Cited in the file of this patent
UNITED STATES PATENTS

| | | |
|---|---|---|
| 343,962 | Mack | June 15, 1886 |
| 1,327,467 | Griner | Jan. 6, 1920 |
| 2,129,605 | Catini | Sept. 6, 1938 |
| 2,130,318 | Cruzan | Sept. 13, 1938 |
| 2,190,722 | Martin | Feb. 20, 1940 |
| 2,549,061 | Dauenhauer | Apr. 17, 1951 |